United States Patent [19]
Nanzai

[11] Patent Number: 5,577,875
[45] Date of Patent: Nov. 26, 1996

[54] TRANSPORTER WITH FUNCTION OF MAINTAINING AND MOVING CENTER OF GRAVITY

[75] Inventor: Takashi Nanzai, Fujisawa, Japan

[73] Assignee: Tani Electronics Industry Co., Ltd., Tokyo, Japan

[21] Appl. No.: 106,760

[22] Filed: Aug. 16, 1993

Related U.S. Application Data

[63] Continuation-in-part of Ser. No. 890,273, May 29, 1992, abandoned.

[30] Foreign Application Priority Data

May 29, 1991 [JP] Japan .................... 3-71299 U

[51] Int. Cl.⁶ .................................................. B66F 5/04
[52] U.S. Cl. ............................... 414/680; 212/279
[58] Field of Search ........................ 414/589, 590, 414/591, 680, 909; 254/8 R, 124; 280/5.2; 212/154, 189, 279; 180/8.2

[56] References Cited

U.S. PATENT DOCUMENTS

3,087,630  4/1963  Karnow et al. ................... 414/590
4,687,068  8/1987  Pagett ................................ 180/8.2

*Primary Examiner*—Donald W. Underwood
*Attorney, Agent, or Firm*—Foley & Lardner

[57] ABSTRACT

A transporter for carrying on a surface an object having a center of gravity, the transporter including a first arm having a longitudinal center line which is arranged to lift the object; a second arm operatively connected to the first arm at one end thereof; a wheel rotatably mounted to the second arm, the wheel having an axis of rotation, the first arm being disposed relative to the wheel so that the longitudinal center line of the first arm intersects the axis of the wheel; a sensor for sensing a variation of an inclination angle of the second arm relative to the surface; and a drive mechanism, connect to the sensor, for driving the first arm, the sensor controlling the drive mechanism such that the drive mechanism moves the first arm in response to the sensed variation of the inclination angle of the second arm relative to the surface so as to maintain the center of gravity of the object above the axis of the wheel regardless of the inclination of the second arm relative to the surface.

13 Claims, 9 Drawing Sheets

TRANSPORTER WITH FUNCTION OF MAINTAINING AND MOVING CENTER OF GRAVITY

CROSS-REFERENCES TO RELATED APPLICATIONS

This application is a continuation-in-part of U.S. Ser. No. 07/890,273, filed on May 29, 1992, which is now abandoned.

BACKGROUND OF THE INVENTION

The present invention relates to a transporter which enables an operator to carry by himself a heavy object to a predetermined place.

Conventionally, when an object, having a weight which is too heavy to be lifted by one person, needs to be carried, transport of the object should be carried out by a plurality of operators, or by a special vehicle such as a forklift, a truck with crane, etc.

The prior art transporters, and in particular the above-mentioned special vehicles which are used to carry heavy objects, are extremely expensive and require highly skilled operators in order to perform the transport function.

Further, if the ground or floor surface of a place on which transport work is to be carried out is not flat, the object being transported should be fixed to the transporter so that it will not slip off during transport.

SUMMARY OF THE INVENTION

It is, therefore, an object of the present invention to provide a transporter having a simple mechanism which enables a single operator to safely and easily manipulate the transporter without requiring any specialized operational training of the operator.

The above object is met by providing a transporter for carrying on a horizontal ground surface an object having a center of gravity, the transporter including a first arm having a longitudinal center line which is arranged to lift the object; a second arm operatively connected to the first arm at one end thereof; a wheel rotatably mounted to the second arm, the wheel having an axis of rotation, the first arm being disposed relative to the wheel so that the longitudinal center line of the first arm intersects the axis of the wheel; a sensor for sensing a variation of an inclination angle of the second arm relative to the surface; and a drive mechanism, connected to the sensor, for driving the first arm, the sensor controlling the drive mechanism such that the drive mechanism moves the first arm in response to the sensed variation of the inclination angle of the second arm relative to the horizontal ground surface so as to maintain the center of gravity of the object above the axis of the wheel regardless of the inclination of the second arm relative to the surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Referring to the drawings, a preferred embodiment of the present invention will be described.

Referring first to FIGS. 1–4, a transporter includes a pair of drive arms 1 each arranged on an auxiliary arm 4, and a pair of operation arms 2 each mounted at a first end thereof to an auxiliary arm 4. The operation arms 2 each have a second end which is connected to the second end of the opposing operation arm by a drag bar 3 to which a control part 5 for setting an operation mode of the transporter is mounted. The control part 5 has a lift operation switch 32 and an initializing switch 34 thereon which will be discussed in more detail below. Connected to each drive arm 1 in the upper end portion thereof, via a chain 11, is a hook 12 for catching an object 13 which is to be carried. The inclination of each drive arm 1 is adjustable by a drive shaft 9 slidably fitted in a cylinder 10. The transporter is movable by a pair of front wheels 7 connected by an axle 6 and a pair of rear wheels 8 each rotatably mounted to one of the auxiliary arms 4. The drive arms 1 are positioned such that a longitudinal center line thereof intersect the axis of the front wheels 7. Up and down switches 17, 18 are arranged in each of the auxiliary arms 4 at the front end portions thereof, so as to be turned on when the operation arms 2 rotate and compress springs 19 and to be turned off when the springs 19 are not compressed. Reinforcing plates 20, 21 are arranged between and connect the auxiliary arms 4 to each other. Moreover, a battery 36 is disposed in reinforcing plate 21 and provides electric power to all of the components of the system.

Figure 14:
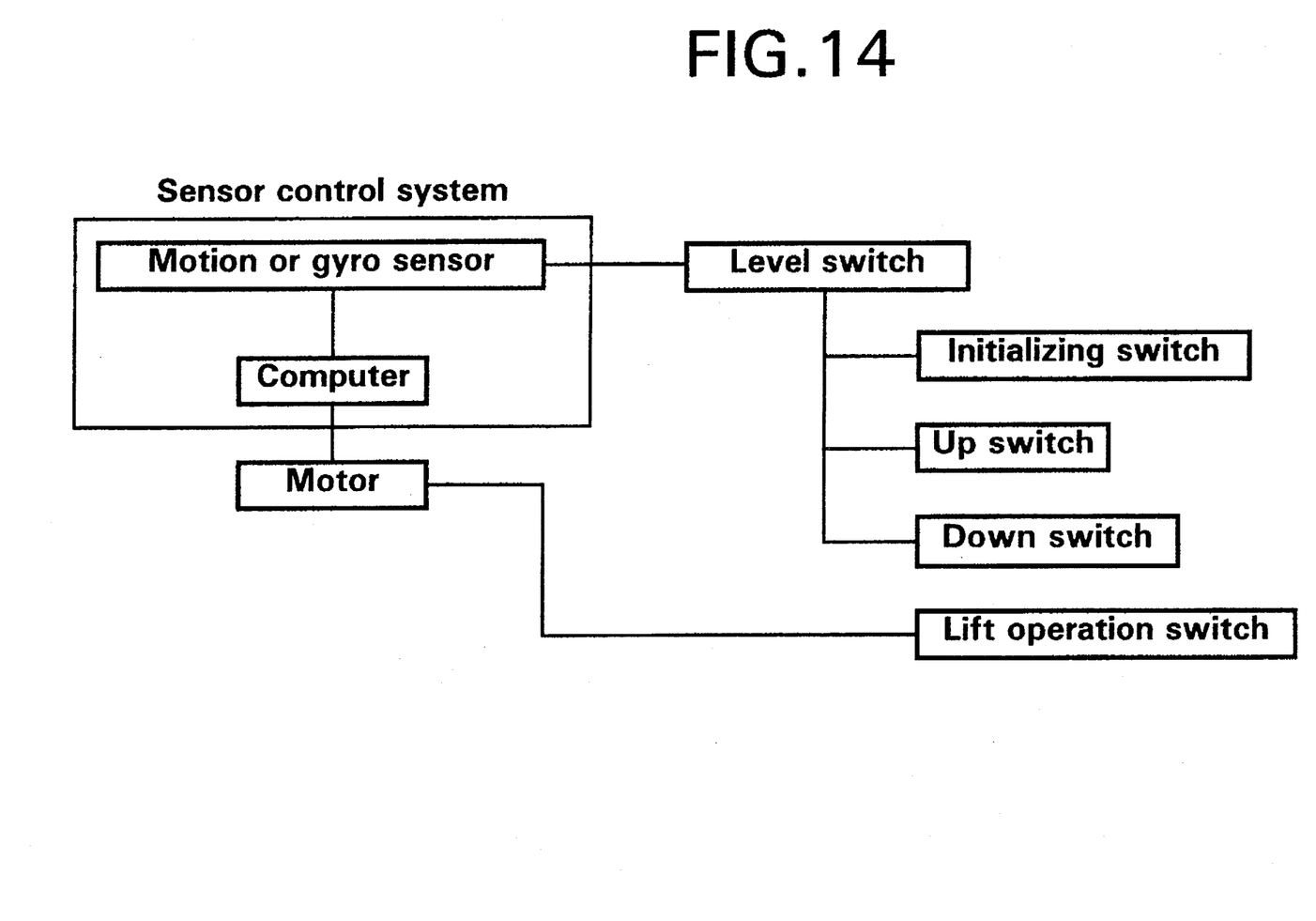
FIG. 14 is a schematic diagram showing the interrelationships between functional components of the invention.

A sensor control system 25 is mounted in auxiliary arm 4. Referring to FIG. 14, it is shown that the sensor control system 25 includes a motion or gyro sensor and a computer. The computer is connected to a bi-directional motor 23 of a hydraulic pump, the hydraulic pump and motor 23 being disposed within drive arm 1. Each drive arm includes a pump and motor 23. The computer controls the movement of motor 23 and senses the rotational movement of the motor 23. Accordingly, when the motor 23 is rotated to either extend or contract the drive shaft 9, the computer calculates the exact location of the drive arms 1 relative to auxiliary arms 4. The computer controls the movement of motor 23 by providing a pulse signal thereto.

Figure 1:
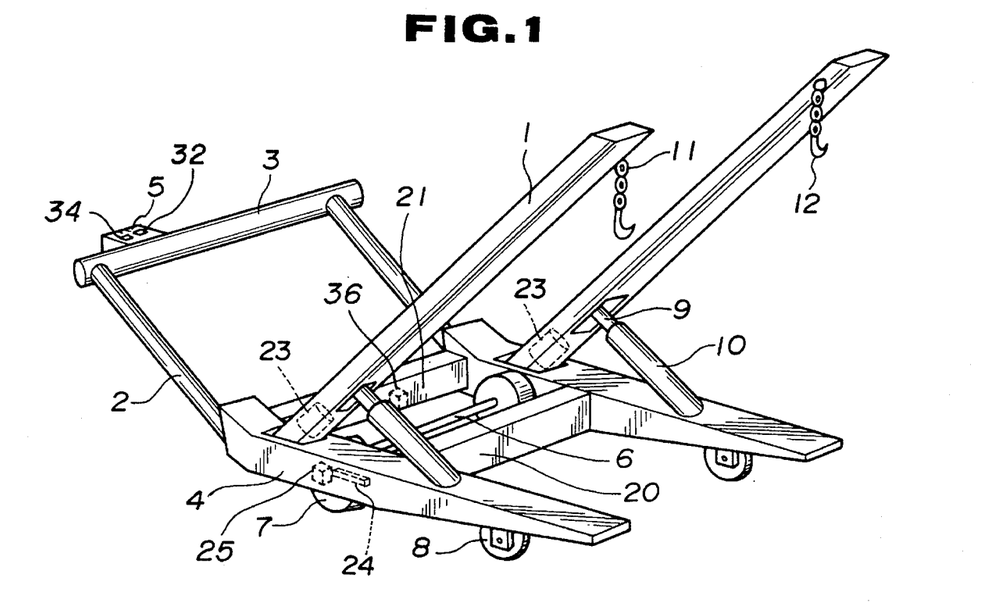
FIG. 1 is a perspective view showing a preferred embodiment of a transporter according to the present invention.
Figure 2:
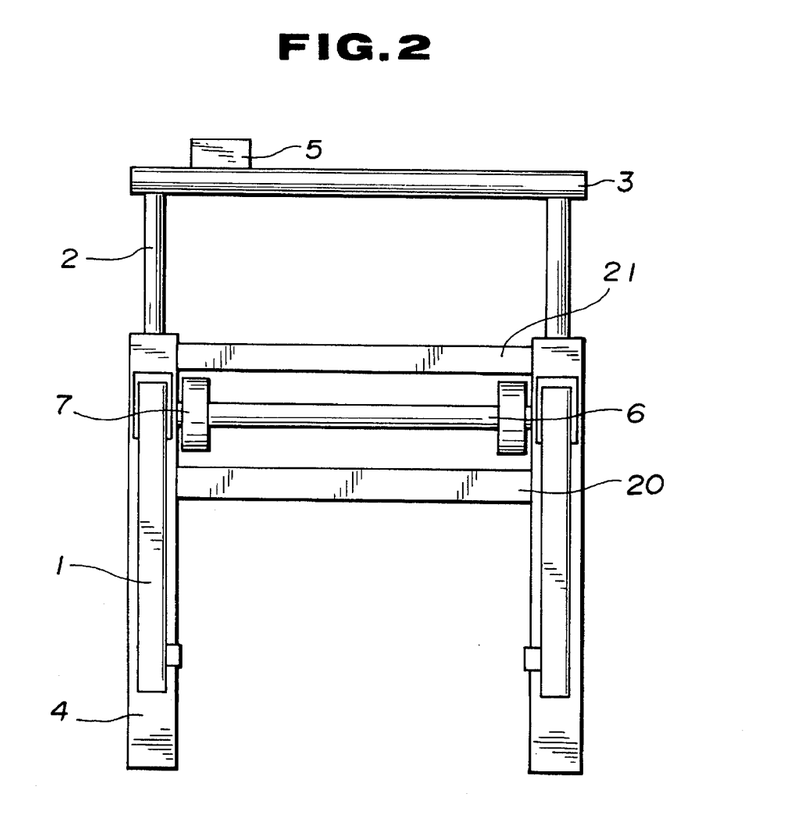
FIG. 2 is a plan view of the transporter of FIG. 1.
Figure 3:
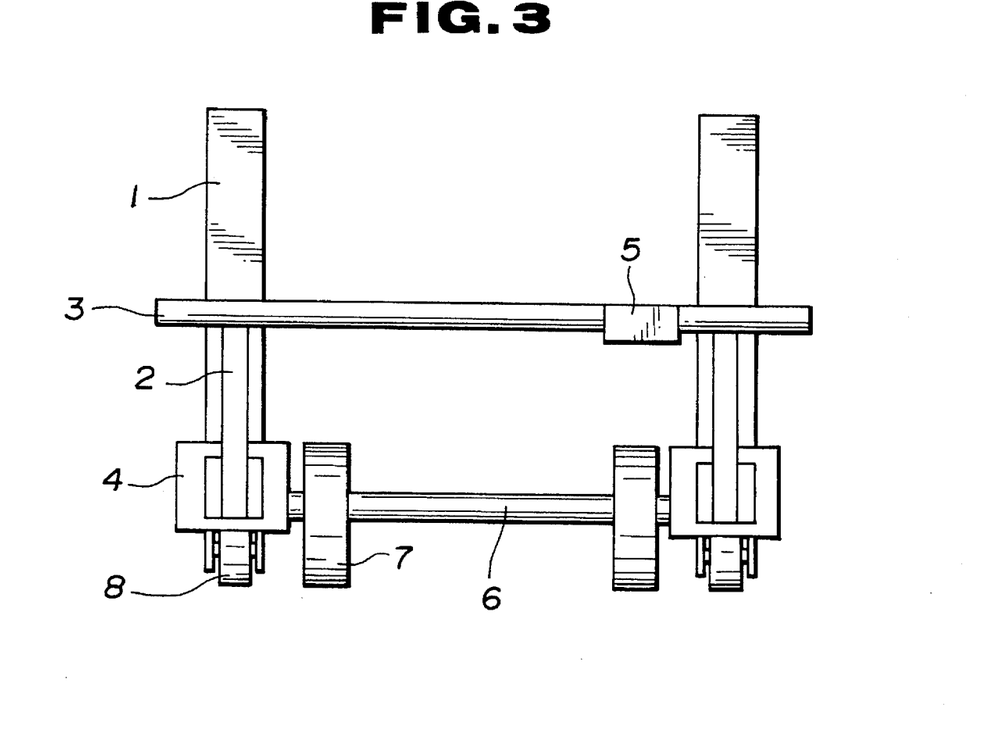
FIG. 3 is a front view of the transporter as viewed from the side of a drag bar.
Figure 4:
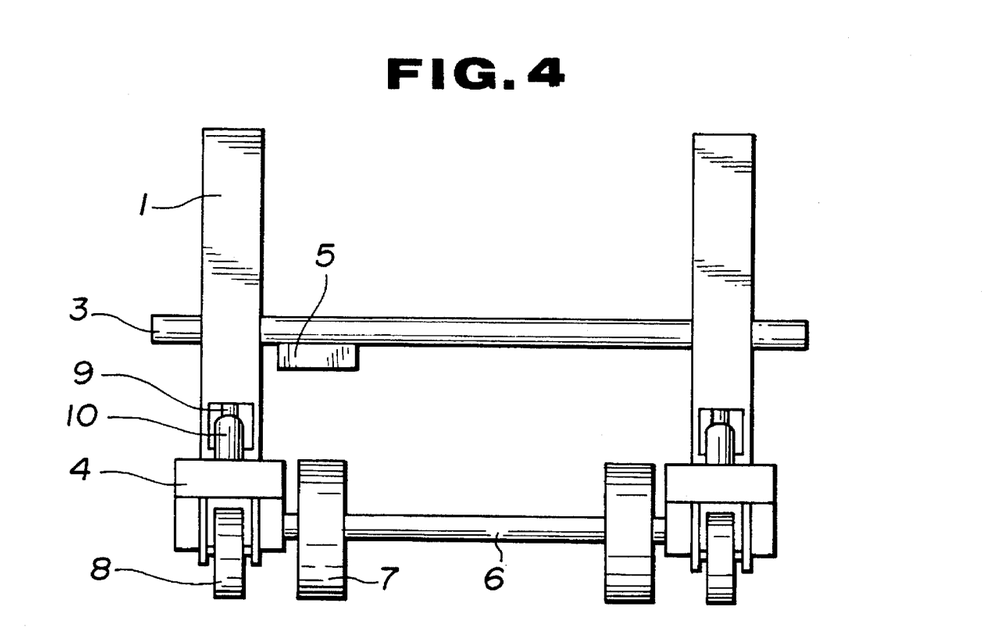
FIG. 4 is a rear view of the transporter as viewed from the side of rear wheels.
Figure 5:
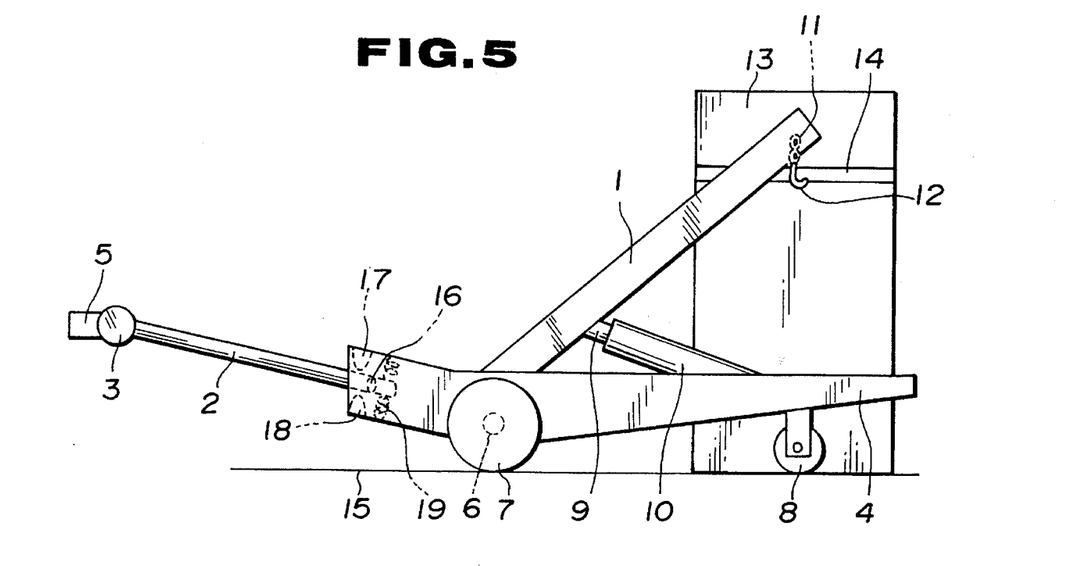
FIG. 5 is a side view of the transporter when lifting up an object.
Figure 6:
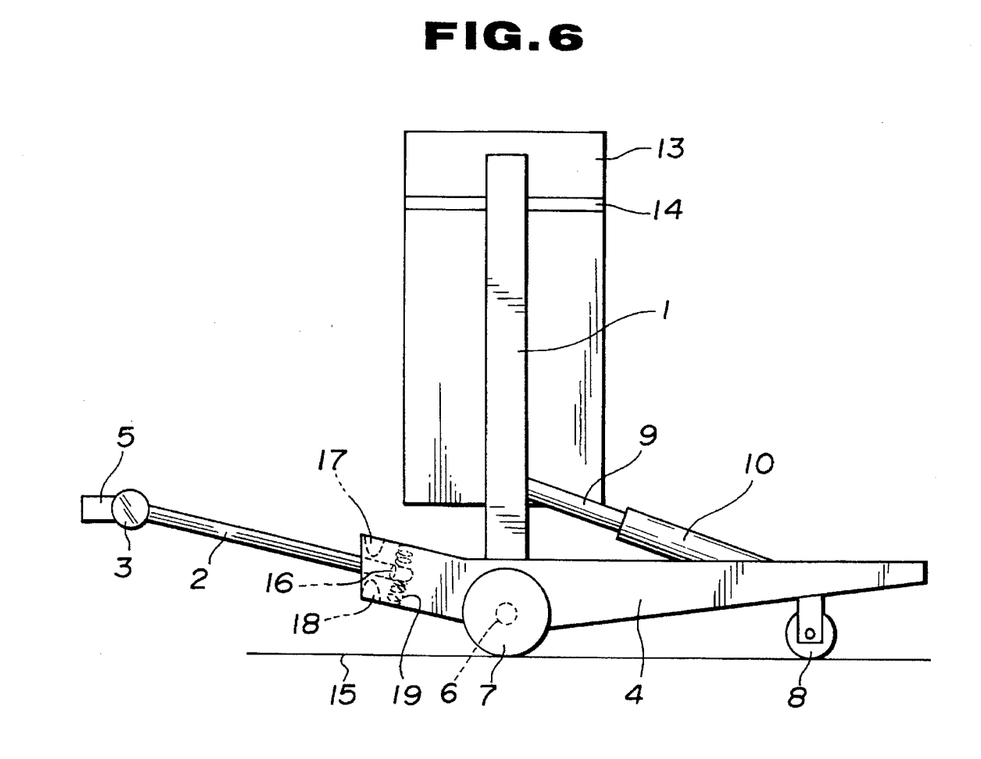
FIG. 6 is a view similar to FIG. 5, but after lifting up the object.

Next, the operation of this embodiment will be described. Referring particularly to FIGS. 5 and 14, when lifting up the object 13 which is to be carried, the transporter is moved so that the object 13 is located between the two auxiliary arms 4. The hooks 12 which are fixed to the chains 11 at one end thereof catch a belt 14 which is put round the object 13. Then, the lift operation switch 32 is turned on. The lift operation switch 32 is directly connected to the motor 23 of the hydraulic pump and the battery 36, and when in the on position, allows electric power to be provided to the motor 23, thereby causing the motor 23 to rotate so that the drive shaft 9 within the cylinder 10 extends or contracts relative to the control part 5 due to a worm gear mechanism (not shown). That is, the lift operation switch 32 has three modes: front, rear and off. When the lift operation switch 32 is placed in the front position, the drive shaft 9 extends, and when placed in the rear position, the drive shafts contracts. The movement of the drive shaft 9 causes a corresponding rotation of the drive arms 1.

If at the start of the transport of the object 13, the operator wants the center of gravity of the object 13 to be directly above axle 6, this can be accomplished in two ways. First, the lift operation switch 32 could be used to align the center of gravity of the object 13 over the axle 6. The operator would simply activate the lift operation switch 32 to rotate the arms 1 into the desired position, and then turn the lift operation switch 32 off. Alternatively, the system is designed such that the center of gravity of the object 13 can automatically be brought into position above axle 6. That is, first, the lift operation switch 32 is activated to rotate the drive arms 1, catching the belt 14. Upon turning the initializing switch 34 on, the sensor control system 25 is actuated. The motion sensor of the sensor control system 25 serves to automatically detect the angular relationship between the auxiliary arms 4 and the horizontal ground surface. If the arms 4 are inclined relative to the horizontal ground surface, the motion sensor detects this inclination, and provides a signal to the computer, which is indicative of the angle. When receiving the signal out of the motion sensor, the computer outputs a signal to the motor 23, which is indicative of the number of and direction of rotation required to move the drive arms 1 to a position where the center of gravity of the object 13 is above the axle 6.

However, if the auxiliary arms are not inclined relative to the horizontal ground surface, the motion sensor provides a signal to the computer, which is indicative that the auxiliary arms 4 are in this orientation. Thus, the computer outputs a signal to the motor 23, which is indicative of the number of and direction of rotation required to move the drive arms 1 up to an initial default position, for example, 90° relative to the auxiliary arms 4.

After, the motor 23 is rotated in response to the signal from the computer, it is then automatically stopped. Also, at this time, the initializing switch 34 is automatically turned off. The lift operation switch 32 can be used to fine tune the positioning of drive arm 1 if necesary.

Next, prior to the actual dragging of the transporter, an operation mode is set to an automatic mode via the control part 5. The automatic mode is opposed to a so-called manual mode, and corresponds in the present invention to an operation mode for driving a drive mechanism of the transporter so as to automatically maintain the center of gravity of the object 13 above the axle 6 in response to a variation of an inclination angle of the ground surface 15 on which the transport work is being carried out. The manual mode corresponds to an operation mode wherein an operator operates the drive mechanism of the transporter on his judgement when lifting down the object 13 after its transport to a predetermined place or carrying out a fine adjustment of a position of the drive arm 1 as previously described in connection with the lift operation switch 32.

Figure 7:
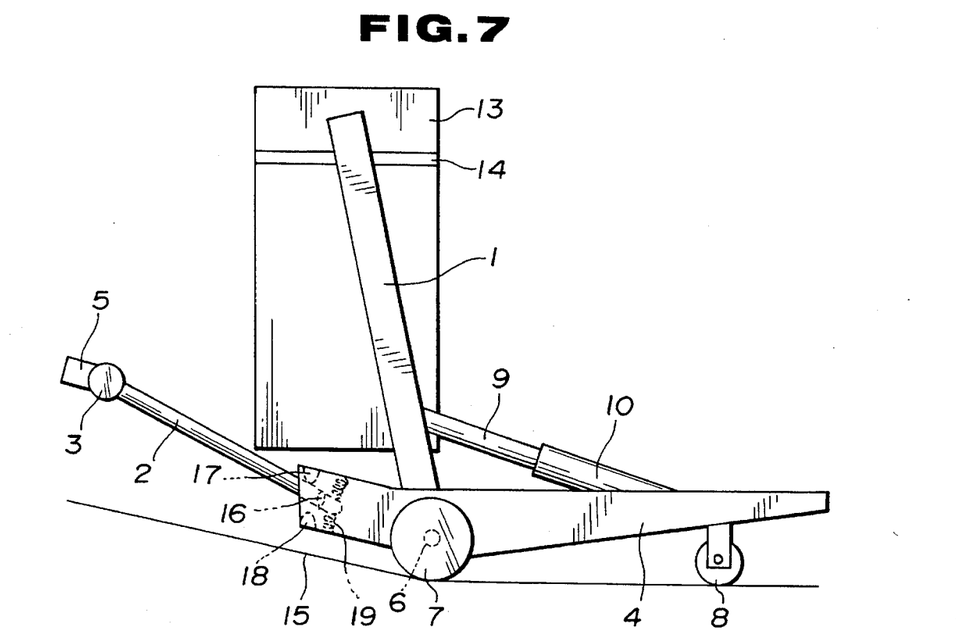
FIG. 7 is a view similar to FIG. 6, but immediately before front wheels reach an up incline.
Figure 8:
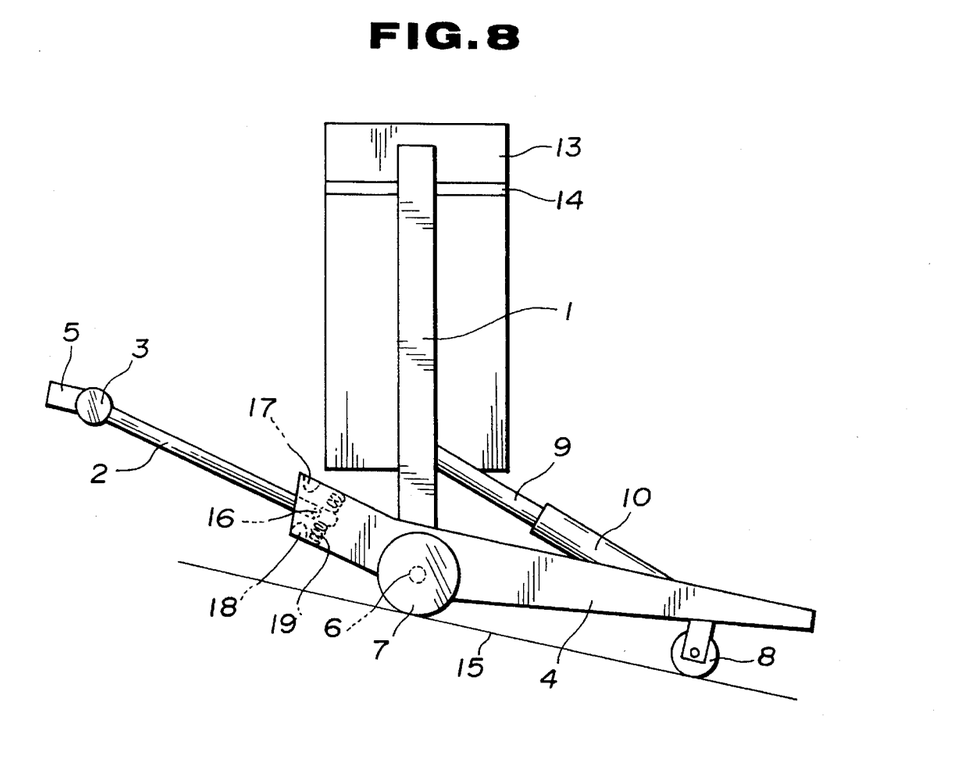
FIG. 8 is a view similar to FIG. 7, but showing when the transporter is moving on the up incline.

Referring to FIGS. 7 and 14, after setting the operation mode to the automatic mode via the control part 5, if the transporter encounters, for example, an up incline while the operator drags the transporter via the drag rod 3 to carry the object 13, the transporter behaves as follows.

When the operator passes from a flat ground surface 15 to an up incline of the ground surface 15 ahead of the transporter, the operation arm 2 rotates in the direction of the drive arm 1 about a supporting shaft 16, acting as a fulcrum, in accordance with a rise of the drag rod 3. This rotation causes the peripheral surface of the operation arm 2 to press up switch 17 which is thus turned on. At about the same time, an automatic level switch 24, which is mounted in auxiliary arm 4, is also turned on due to the change in the inclination angle of auxiliary arms 4 relative to ground surface 15. When the operator steps forward such that a front wheel 7 of the transporter moves up the incline to produce an inclination of the auxiliary arm 4 relative to the ground surface 15, the level switch 24 allows electric power to flow to and turn on the control system 25 such that a variation of the inclination angle of the auxiliary arm 4 relative to the ground surface 15 is detected by the motion sensor. The motion sensor provides a signal to the computer which is indicative of the inclination angle, and the computer controls the motor 23 to rotate such that the drive arm 1 is moved in the direction of the operation arm 2 by an angle which corresponds to the detected inclination angle. The center of gravity of the object 13 is thus moved above axle 6 by rotation of the drive arm 1 in the direction of the operation arm 2, which is an action for correcting the position of the center of gravity of the object 13 which has moved backward relative to the axle 6 due to the change in inclination of the auxiliary arm 4 relative to the ground surface 15. The pressed state of the operation arm 2 to the up switch 17 is canceled and turned off when a rear wheel 8 reaches the up incline such that no electric power is provided from the battery 36 via the up switch 17 to the level switch 24. Such correcting action of the position of the center of gravity is successively carried out until the up switch 17 is turned off.

Figure 9:
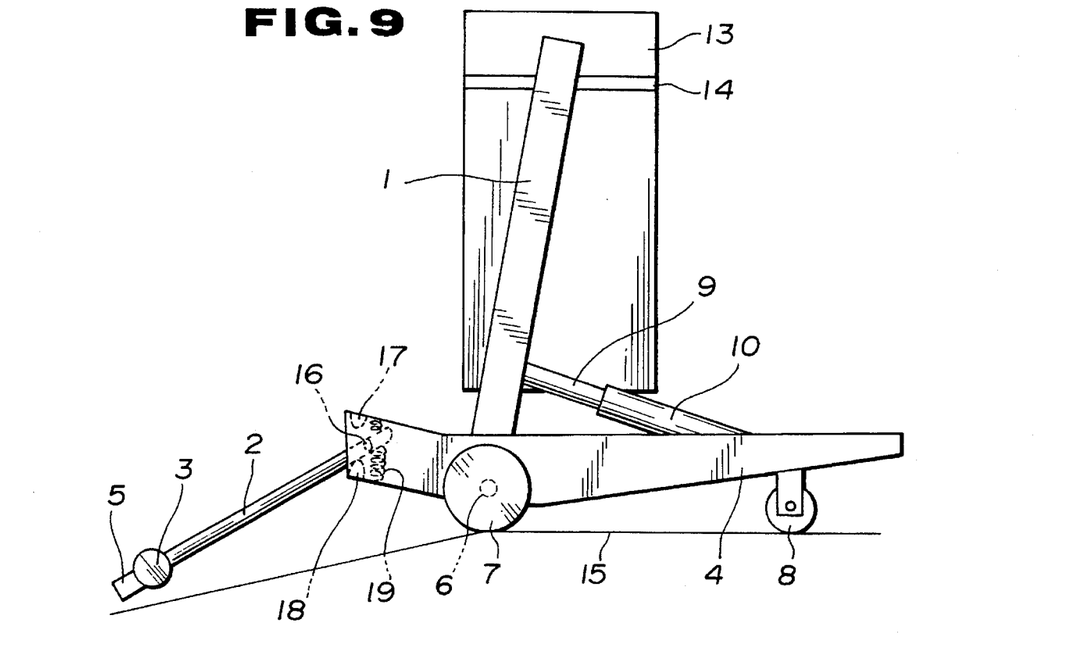
FIG. 9 is a view similar to FIG. 8, but immediately before the front wheels reach a down incline.
Figure 10:
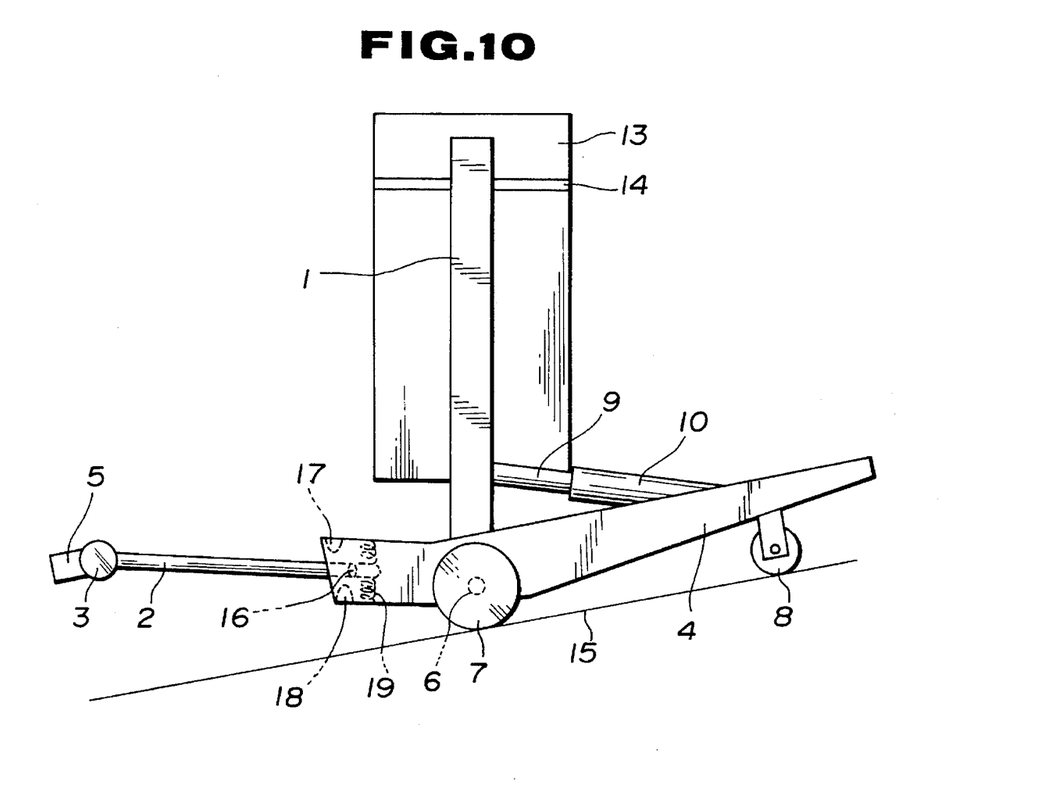
FIG. 10 is a view similar to FIG. 9, but showing when the transporter is moving on the down incline.

On the other hand, referring to FIG. 9, when the operator comes to a down incline of the ground surface 15 ahead of the transporter, the operation arm 2 rotates in the direction of the operator about the supporting shaft 16 in accordance with a lowering of the drag rod 3. This rotation causes the peripheral surface of the operation arm 2 to press the down switch 18 which is then turned on. At about the same time, the level switch 24 is turned on when the auxiliary arms 4 are no longer aligned with the ground surface 15. When the operator steps forward, and the front wheels 7 of the transporter reaches the down incline to produce an inclination of the auxiliary arm 4 relative to ground surface 15, the level switch 24 allows electric power to flow to the control system 25 such that the motion sensor detects a variation of the inclination angle of the auxiliary arm 4 relative to ground surface 15. The computer receives a signal from the motion sensor which is indicative of the inclination of the inclination angle and of the auxiliary arms 4 relative to ground surface 15 and in turn controls the motor 23 to rotate the drive arm 11 in the direction of the rear wheel 8 by an angle corresponding to the inclination angle. The center of gravity of the object 13 is thus moved by rotation of the drive arm 1 in the direction of the rear wheel 8, which is an action for correcting the position of the center of gravity of the object 13 which has moved forward of the axle 6 due to the change in inclination of the auxiliary arm 4 relative to the ground surface 15. The pressed state of the operation arm 2 to the down switch 18 is canceled and turned off when the rear wheel 8 reaches the down incline. At the same time, the level switch 24 no longer receives electric power from the battery 36 via switch 18. Such correcting action of the position of the center of gravity is successively carried out until the down switch 18 is turned off.

If a stop position of the drive shaft 9, i.e., a position of the center of gravity of the object 13, is not optimal when the up switch 17 or the down switch 18 is turned off, the position of the drive arm 1 can be adjusted as previously discussed by using the lift operation switch 32.

When putting down the object 13 on the ground after its transportation to a predetermined place, the drive arm 1 is rotated on the side of the rear wheel 8 by operation of lift operation switch 32.

Having described an embodiment with reference to the drawings, it is to be noted that the present invention is not limited thereto, but various modifications may be made therein without departing from the scope of the claims. By way of example, the following modifications or the combination thereof are possible.

First, the drive mechanism for operating the drive arm 1 may be the combination of an electric motor and a mechanical device, and include a pneumatic cylinder.

Secondly, when the drive mechanism uses electric power, a power source may be a charging type battery, a small-sized generator, or a power supply for domestic use by providing a power cord.

Thirdly, different lifting members such as lever type vacuum suction cups, etc. can be used in place of the hook 12.

Fourthly, it is possible to eliminate the sensor control system 25 and level switch 24 from the apparatus to produce a simpler design. That is, in this configuration the lift operation switch 32 is used to initially move the center of gravity of the object 13 above axle 6. Then, with reference to FIG. 7, while the operator drags the transporter on the flat ground (or a ground surface where inclination is not changing) the position of the operator's hand and the drag bar 3 is remains unchanged, and the distance between the drag bar 3 and the ground is always constant. However, when the operator reaches ground having a different inclination angle prior to the transporter, the distance between the drag bar 3 and the ground surface varies temporarily on the following principle.

When the operator reaches the up incline from, for example, the flat ground surface prior to the front wheels 7, the drag bar 3 is pivoted upward on the supporting shaft 16 with ascension of the operator, so that the distance between the drag bar 3 and the inclined surface becomes greater than in the above stable dragging situation where the inclination angle is not changing. Thus, the operation arm 2 comes in contact with the up switch 17 which is turned on.

While the up switch 17 is turned on, electric power from battery 36 is provided to motor 23 such that the motor 23 is rotated in a certain direction and at a certain speed to move the drive arm 1 in the certain direction and at the certain speed.

As operator continues to move, the front wheels 7 are on the incline. However, immediately before the rear wheels 8 reach the incline, the operation arm 2 and the up switch 17 are still in contact with each other, so that rotation of the motor 23 and the drive arm 1 is carried out continuously.

When the rear wheels 8 move onto the incline, the distance between the drag bar 3 and the inclined surface becomes equal to the above stable dragging situation, so that the operation arm 2 fails to be in contact with the up switch 17, thus turning off the up switch 17 and stopping movement of the motor 23 and the drive arm 1.

If the drive arm 1 fails to move to a point above the axle 6 during a period from a point where the operator reaches the incline to a point where the rear wheels 8 reach the incline, the drive arm 1 can be moved above the axle 6 by turning on the lift operation switch 32 in the Rear mode.

On the other hand, when the operator passes from flat ground to a down incline, the down switch 18 carries out the same operation in place of the up switch 17 except that rotation of the drive arm 1 is in the opposite direction.

As described above, in this variant, the drive arm 1 is not automatically moved and stopped above the axle 6 by accurately sensing the inclination angle, but it is moved in a certain direction depending on the inclination. However, the position when movement of the drive arm 1 is stopped, i.e., the time from a point the operator reaches the incline to a point the rear wheels 8 reach the incline, can be determined by the moving speed of the operator, so that if the operator has a lot of experience in operating the transporter, the positional adjustment of the drive arm 1 by the lift operation switch 32 can be effectively excluded.

Figure 15:
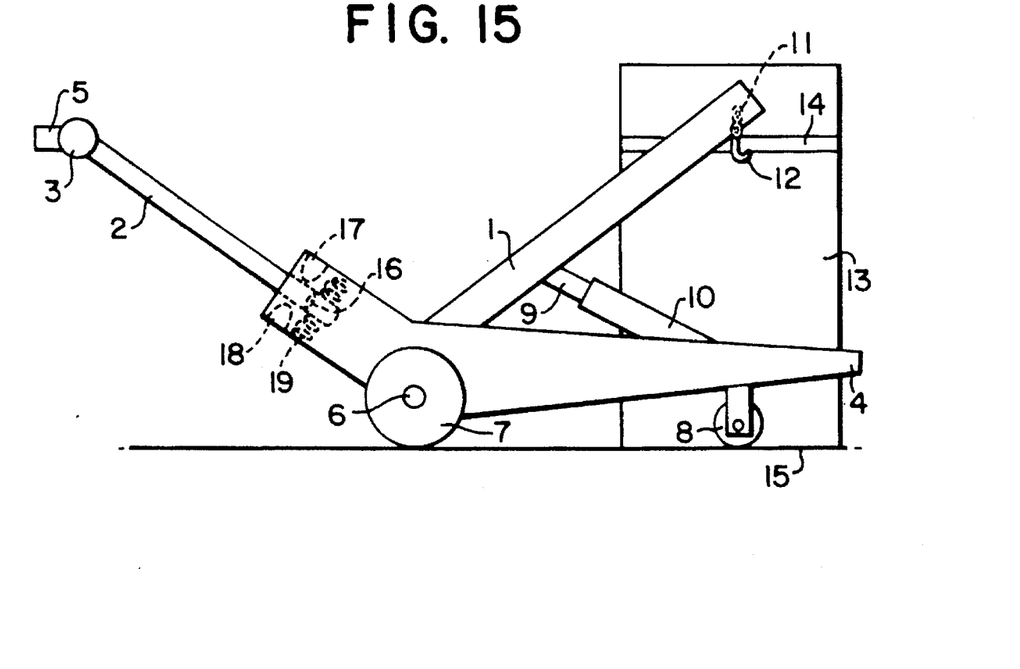
FIG. 15 is a view similar to FIG. 10, but showing another embodiment of a transporter having a larger angle between an operation arm and a ground surface.
Figure 16:
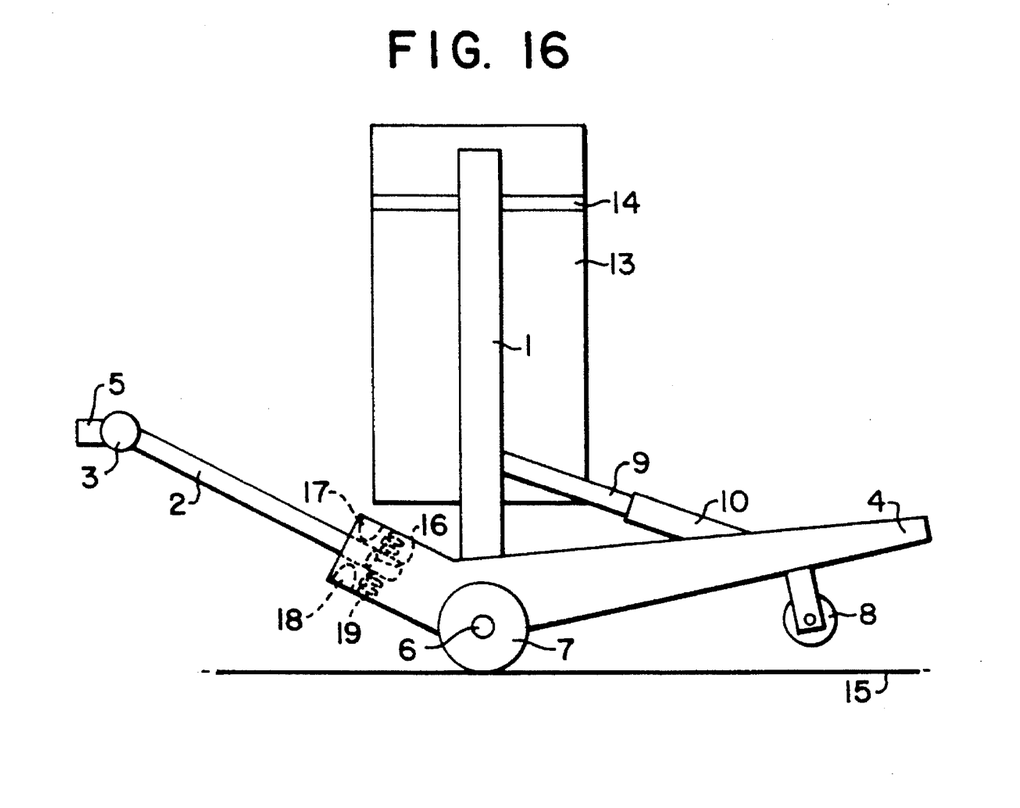
FIG. 16 is a view similar to FIG. 15, but showing the transporter of FIG. 15 with a rear wheel raised off the ground surface.

Fifthly, referring to FIGS. 15 and 16, if the transporter is designed and constructed such that a larger angle is formed between the operation arm 2 and the ground surface 15, the center of gravity of the object 13 can be maintained above the axle 6 with the rear wheel 8 lifted up from the ground surface 15 during transport. Specifically, with this transporter, when lifting up the object 13, the operator has to depress the operation arm 2 through the drag bar 3 so as to obtain an easily operable height of the operation arm 2, which produces rotation of the auxiliary arm 4 about the axle 6, thus enabling the rear wheel 8 to be lifted from the ground surface 15 as shown in FIG. 15. After start of such depressing action, the down switch 18 is turned on. In this state, the motor 23 starts to rotate the drive arm 1 in the direction of the operation arm 2, so that after this, the operator can depress the operation arm 2 little by little in accordance with movement of the center of gravity of the object 13. If the operator stops the depressing action when the operation arm 2 gets to an appropriate height, the down switch 18 is turned off, stopping the moving action of the drive arm 1. The above action enables the center of gravity of the object 13 to move above the axle 6 at any height of the operation arm 2. It is to be noted that with the transporter of the type of lifting up the object 13 by the depressing action of the operation arm 2, the rear wheel 8 may be eliminated.

Sixthly, in the case where the ground surface 15 or a contact surface is flat as far as a predetermined point to which the object 13 has to be transported, and the center of gravity of the object 13 is relatively stable, a rack may be mounted on the auxiliary arm 4 to carry the object 13, the lower face thereof being in contact with the rack during transport.

Seventhly, a reinforcing member can be added between the drive arm 1 and the auxiliary arm 4 for preventing torsion of the transporter, or a brake mechanism can be added for increasing the safety of work during movement of the transporter.

Eighthly, an extension mechanism can be added to the drive arm 1, the auxiliary arm 4 or the drag bar 3, or all of these components to further improve the operability of the transporter.

Figure 11:
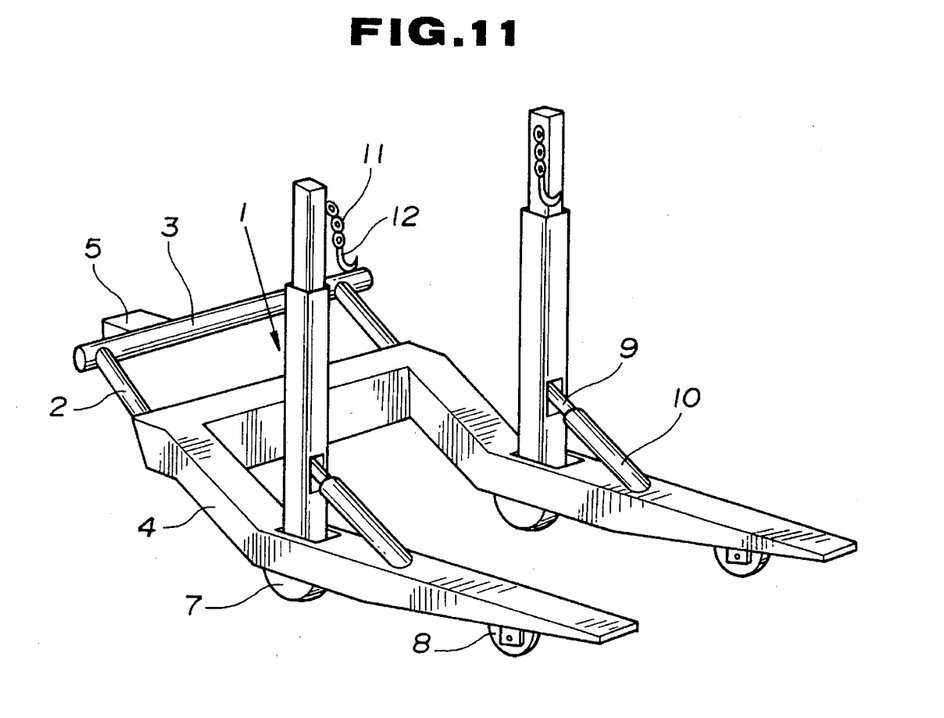
FIG. 11 is a view similar to FIG. 1, but showing another embodiment of a transporter having drive arms with an extension mechanism.

Ninthly, referring to FIG. 11, in the case where the drive arm 1 is provided with an extension mechanism, if the two auxiliary arms 4 are integrally formed to U-shaped, and the front wheel 7 is mounted within the auxiliary arms 4, and the axle 6 and the reinforcing plates 20, 21 are eliminated, the object 13 can be lifted up and down only be an extension motion of the drive arm 1, resulting in a more facile transport of heavy or long objects.

Figure 12:
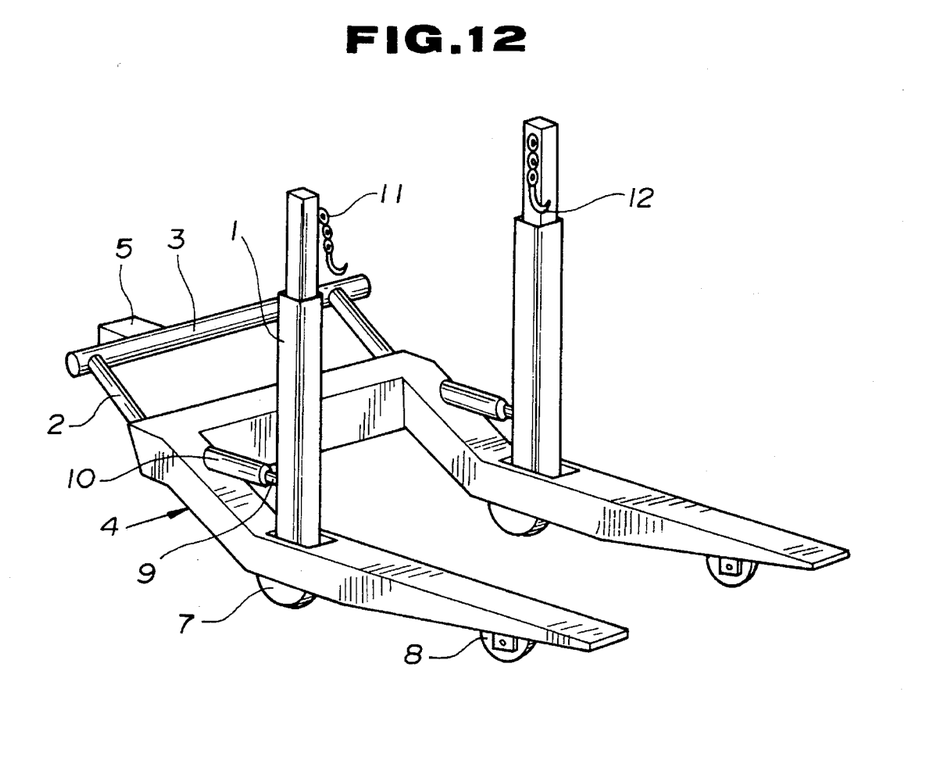
FIG. 12 is a view similar to FIG. 11, but showing still another embodiment of a transporter wherein the mounting position of drive shafts and cylinders is changed.

Tenthly, referring to FIG. 12, the mounting position of the drive shaft 9 and the cylinder 10 can be changed to drive the drive arm 1 on the side of the drag arm 3.

Figure 13:
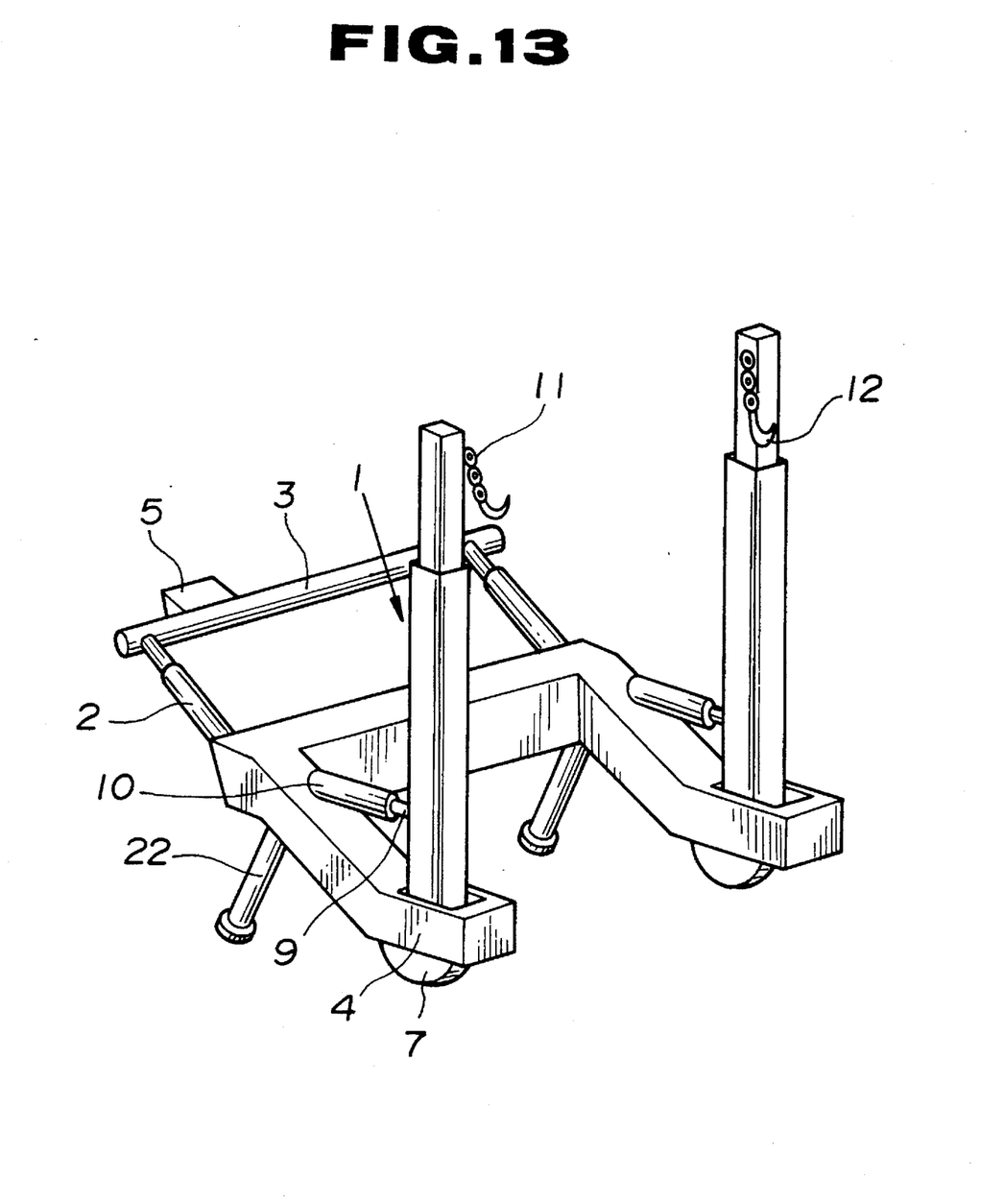
FIG. 13 is a view similar to FIG. 12, but showing a transporter having shortened auxiliary arms.

Eleventhly, referring to FIG. 13, if the length of the auxiliary arm 4 is decreased in addition to the modification just previously described in connection with FIG. 12, transport work can be done without an end of the drive arm 4 being knocked against a wall when lifting up an object 13 which is located near the wall, or lifting down the same near a wall. Upon lifting-up or lifting-down the object 13, in order to minimize a load applied to the operator by movement of the center of gravity of the object 13 with rotation of the drive arm 1, a support 22 received or housed within auxiliary arm 4 is drawn out temporarily therefrom so that one end thereof touches the ground. If the drag bar 3 with extension mechanism is adopted, and the operator holds the same in its extension state upon lifting-up or lifting-down of the object 13, the above load experienced by the operator can be further decreased.

Lastly, the transporter may be provided with traction means such as an engine, etc. for automatic operation.

Additional advantages and modifications will be readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A transporter for carrying relative to a horizontal ground surface an object having a center of gravity, comprising:

first arm means for lifting the object, said first arm means having a longitudinal center line;

second arm means, operatively connected to said first arm means at one end thereof, for supporting said first arm means;

wheel means, rotatably mounted to said second arm means, for enabling movement of the transporter, said wheel means having an axis of rotation, said first arm means being disposed relative to said wheel means so that said longitudinal center line of said first arm means extends through said axis of said wheel means and a pivot point between said first and second arm means;

a sensor means, connected to said second arm means, for sensing a variation of an inclination angle of said second arm means relative to the horizontal ground surface, said sensor means comprising an initializing switch which is turned off when the transporter is in an initial default position wherein said longitudinal center line of said first arm means forms a predetermined angle with respect to the horizontal ground surface;

drive means, interposed between said first and second arm means, for driving said first arm means; and a computer based control unit connected to said sensor means and said drive means, said computer based control unit controlling said drive means such that said drive means move said first arm means relative to said second arm means in response to said sensed variation of said inclination angle of said second arm means relative to the horizontal ground surface so as to maintain the center of gravity of the object in a position consistent with said initial default position.

2. A transporter as claimed in claim 1, wherein said drive means include a motor-driven hydraulic pump, a hydraulic cylinder, and a drive shaft slidably fitted in said hydraulic cylinder.

3. A transporter as claimed in claim 2, wherein said device shaft has one end connected to said first arm means, and said hydraulic cylinder has one end connected to said second arm means at a first portion thereof.

4. A transporter as claimed in claim 3, wherein said hydraulic cylinder has one end connected to said second arm means at a second portion thereof opposite to said first portion with respect to one end of said first arm means.

5. A transporter as claimed in claim 1, wherein said sensor means further includes an up switch, a down switch, a level switch, and operation arms which activate the up and down switches to move the first arm up and down, respectively.

6. A transporter as claimed in claim 1, wherein said first arm means include an extension mechanism.

7. A transporter as claimed in claim 1, wherein said second arm means are a U-shaped auxiliary arm.

8. A transporter as claimed in claim 1, further comprising a support extending from said second arm means.

9. A transporter as claimed in claim 1, wherein said drive means includes a pneumatic cylinder and a drive shaft slidably fitted in said pneumatic cylinder.

10. A transporter as claimed in claim 1, wherein said predetermined angle is 90 degrees.

11. A transporter for carrying relative to a horizontal ground surface an object having a center of gravity, comprising:

first arm means for lifting the object, said first arm means having a longitudinal center line;

second arm means, operatively connected to said first arm means at one end thereof, for supporting said first arm means;

wheel means, rotatably mounted to said second arm means, for enabling movement of the transporter, said wheel means having an axis of rotation, said first arm means being disposed relative to said wheel means so that said longitudinal center line of said first arm means extends through said axis of said wheel means and a pivot point between said first and second arm means;

drive means, interposed between said first and second arm means, for driving said first arm means;

setting means, connected to said drive means, for initially setting said first arm means so that the center of gravity of the object is above said axis of said wheel means;

sensor means, connected to said second arm means, for sensing a variation of an inclination angle of said second arm means relative to the horizontal ground surface; and a computer based control unit connected to said drive means, said setting means, and said sensor means, said computer based control unit controlling said drive means such that said drive means move said first arm means relative to said second arm means in response to said sensed variation of said inclination angle of said second arm means relative to the horizontal ground surface so as to maintain the center of gravity of the object above said axis of said wheel means regardless of said inclination angle of said second arm means relative to the horizontal ground surface.

12. A transporter as claimed in claim 11, wherein said setting means includes a sensor control system and an initializing switch.

13. A transporter as claimed in claim 12, wherein said sensor control system includes a motion sensor.

* * * * *